US010489230B1

(12) United States Patent
Chen et al.

(10) Patent No.: US 10,489,230 B1
(45) Date of Patent: Nov. 26, 2019

(54) CHAINING LOG OPERATIONS IN DATA REPLICATION GROUPS

(71) Applicant: Amazon Technologies, Inc., Seattle, WA (US)

(72) Inventors: Tao Chen, Sammamish, WA (US); Matthew Joseph Zulak, Seattle, WA (US); Lakshmi N. Pallikila, Seattle, WA (US); Shobha Agrawal, Seattle, WA (US); Fan Ping, Kenmore, WA (US); Divya Ashok Kumar Jain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/957,468

(22) Filed: Dec. 2, 2015

(51) Int. Cl.
*G06F 11/00* (2006.01)
*G06F 11/07* (2006.01)

(52) U.S. Cl.
CPC ...... *G06F 11/0787* (2013.01); *G06F 11/0781* (2013.01)

(58) Field of Classification Search
CPC ............. G06F 11/0766; G06F 11/0781; G06F 11/0787; G06F 11/1402; G06F 11/1435; G06F 11/1446; G06F 11/1471
See application file for complete search history.

(56) References Cited

U.S. PATENT DOCUMENTS

| | | |
|---|---|---|
| 5,909,540 A | 6/1999 | Carter et al. |
| 6,374,241 B1 | 4/2002 | Lamburt et al. |
| 7,039,773 B2 * | 5/2006 | Hu .................... G06F 17/30595 707/999.202 |
| 7,461,130 B1 | 12/2008 | AbdelAziz et al. |
| 7,711,820 B2 | 5/2010 | Sharma et al. |
| 7,937,482 B1 | 5/2011 | Vermeulen et al. |
| 8,301,600 B1 * | 10/2012 | Helmick ............. G06F 11/2097 707/648 |
| 8,572,031 B2 | 10/2013 | Merriman et al. |
| 8,732,517 B1 * | 5/2014 | Stefani ............. G06F 17/30584 707/610 |
| 8,843,441 B1 | 9/2014 | Rath et al. |
| 8,856,593 B2 | 10/2014 | Eckhardt et al. |

(Continued)

OTHER PUBLICATIONS

Abadi, "Consistency Tradeoffs in Modern Distributed Database System Design," Computer 45(2):37-42, Feb. 2012.

(Continued)

*Primary Examiner* — Elmira Mehrmanesh
(74) *Attorney, Agent, or Firm* — Davis Wright Tremaine LLP

(57) ABSTRACT

Data replication groups may be used to store data in a distributed computing environment. The data replication groups may include a set of nodes executing a consensus protocol to maintain data durably. In order to monitor and debug the operation of the data replication group a chaining mechanism may be utilized during log creation by the set of nodes of the data replication group. The chaining mechanism may cause entries in the log to indicate an operation being performed and an operation performed immediately prior to the operation being performed. In various embodiments, an outside observer receives the logs and checks the logs for errors indicated by the chaining mechanism.

21 Claims, 10 Drawing Sheets

(56) References Cited

U.S. PATENT DOCUMENTS

| | | | |
|---|---|---|---|
| 8,868,514 B2 * | 10/2014 | Lomet | G06F 17/30575 707/607 |
| 8,965,849 B1 * | 2/2015 | Goo | G06F 17/30327 707/634 |
| 9,047,246 B1 | 6/2015 | Rahut | |
| 9,047,331 B2 * | 6/2015 | Rao | G06F 17/30575 |
| 9,223,843 B1 * | 12/2015 | Madhavarapu | G06F 17/30578 |
| 9,230,000 B1 * | 1/2016 | Hsieh | G06F 17/30575 |
| 9,317,576 B2 | 4/2016 | Merriman et al. | |
| 9,489,434 B1 * | 11/2016 | Rath | G06F 17/30557 |
| 9,552,242 B1 * | 1/2017 | Leshinsky | G06F 11/0727 |
| 9,569,513 B1 | 2/2017 | Vig et al. | |
| 9,639,589 B1 * | 5/2017 | Theimer | G06F 17/30575 |
| 9,805,108 B2 | 10/2017 | Merriman et al. | |
| 10,171,629 B2 | 1/2019 | Bute et al. | |
| 2004/0263152 A1 | 12/2004 | Ahrikencheikh | |
| 2005/0005200 A1 | 1/2005 | Matena et al. | |
| 2006/0020634 A1 * | 1/2006 | Huras | G06F 17/30368 |
| 2006/0218204 A1 * | 9/2006 | Ofer | G06F 11/202 |
| 2007/0156842 A1 | 7/2007 | Vermeulen et al. | |
| 2007/0299955 A1 | 12/2007 | Hoffman et al. | |
| 2009/0049240 A1 | 2/2009 | Oe et al. | |
| 2010/0274768 A1 | 10/2010 | Wang et al. | |
| 2011/0307886 A1 | 12/2011 | Thanga et al. | |
| 2012/0011398 A1 | 1/2012 | Eckhardt et al. | |
| 2012/0117229 A1 | 5/2012 | Van Biljon et al. | |
| 2012/0197868 A1 | 8/2012 | Fauser et al. | |
| 2013/0110774 A1 * | 5/2013 | Shah | G06F 11/1474 707/610 |
| 2013/0290249 A1 | 10/2013 | Merriman et al. | |
| 2014/0032506 A1 * | 1/2014 | Hoey | G06F 17/30303 707/691 |
| 2014/0136896 A1 * | 5/2014 | Tak | G06F 11/079 714/26 |
| 2014/0172944 A1 | 6/2014 | Newton et al. | |
| 2014/0337393 A1 * | 11/2014 | Burchall | G06F 17/30377 707/826 |
| 2015/0169417 A1 | 6/2015 | Brandwine et al. | |
| 2015/0186229 A1 | 7/2015 | Bortnikov et al. | |
| 2015/0347548 A1 | 12/2015 | Mortensen et al. | |
| 2015/0372389 A1 | 12/2015 | Chen et al. | |
| 2016/0147859 A1 * | 5/2016 | Lee | G06F 17/30371 707/615 |
| 2017/0004317 A1 * | 1/2017 | Bumbulis | G06F 21/6218 |
| 2017/0270176 A1 | 9/2017 | Horowitz et al. | |
| 2017/0366451 A1 | 12/2017 | Schreter | |
| 2017/0366619 A1 | 12/2017 | Schreter | |
| 2017/0371567 A1 | 12/2017 | Piduri | |

OTHER PUBLICATIONS

Bernstein, "Rethinking Eventual Consistency," Proceedings of the 2013 ACM SIGMOD International Conference on Management of Data, Jun. 22-27, 2013, 5 pages.

Chandy et al., "Distributed Snapshots: Determining Global States of Distributed Systems," ACM Transactions on Computer Systems 3(1):63-75, Feb. 1985.

DeCandia et al., "Dynamo: Amazon's Highly Available Key-value Store," ACM SIGOPS Operating Systems Review 41(6):205-220, Oct. 14, 2007.

Dwork et al., "Consensus in the presence of partial synchrony," Journal of the Association for Computer Machinery 35(2):288-323, Apr. 1, 1988.

Gilbert et al., "Brewer's Conjecture and the Feasibility of Consistent, Available, Partition-Tolerant Web Services," ACM SIGACT News 33(2):51-59, Jun. 1, 2002.

Gray et al., "Leases: An Efficient Fault-Tolerant Mechanism for Distributed File Cache Consistency," ACM SIGOPS Operating Systems Review 23(5):202-210, Dec. 3-6, 1989.

Lamport et al., "Cheap Paxos," International Conference on InDependable Systems and Networks, Jun. 28, 2004, 9 pages.

Lamport, "Paxos Made Simple," Microsoft Research, http://research.microsoft.com/en-us/um/people/lamport/pubs/paxos-simple.pdf [retrieved Aug. 22, 2016], 2001, 14 pages.

Letia et al., "CRDTs: Consistency without concurrency control," Rapport de recherche 6956, Jun. 2009, 13 pages.

Maccormick et al., "Niobe: A Practical Replication Protocol," Microsoft Research, <https://www.microsoft.com/en-us/research/wp-content/uploads/2007/08/tr-2007-112.pdf> [retrieved Aug. 22, 2016], 2007, 42 pages.

Peleg et al., "The Availability of Quorum Systems," Information and Computation 123(2):210-223, Dec. 1, 1995.

Trencseni et al., "PaxosLease: Diskless Paxos for Leases," Cornell University Library, <http://arxiv.org/pdf/1209.4187.pdf> [retrieved Aug. 22, 2016], 2012, 9 pages.

Wikipedia, "Paxos (computer science)," Wikipedia, the Free Encyclopedia, page last edited Jun. 5, 2017 [retrieved Jun. 6, 2017], https://en.wikipedia.org/w/index.php?title=Paxos_(computer_science)&oldid=783901344, 19 pages.

"Ford-Fulkerson Algorithm," Wikipedia, The Free Encyclopedia, Aug. 9, 2016, https://en.wikipedia.org/wiki/Ford%E2%80%93Fulkerson_algorithm [Retrieved Aug. 29, 2016], 5 pages.

"Maximum flow problem," Wikipedia, The Free Encyclopedia, Aug. 22, 2016, https://en.wikipedia.org/wiki/Maximum_flow_problem [Retrieved Aug. 29, 2016], 11 pages.

Chen et al., "Replication Group Pools for Fast Provisioning," U.S. Appl. No. 14/954,928, filed Nov. 30, 2015.

Dhoolam et al., "Node Placement for Replication Groups," U.S. Appl. No. 15/264,479, filed Sep. 13, 2016.

\* cited by examiner

CHAINING LOG OPERATIONS IN DATA REPLICATION GROUPS

CROSS REFERENCE TO RELATED APPLICATIONS

This application incorporates by reference for all purposes the full disclosure of co-pending U.S. patent application Ser. No. 14/957,477, filed concurrently herewith, entitled "UNSUPERVISED ROUND ROBIN CATCH UP ALGORITHM."

BACKGROUND

Organizations invest in technologies that provide customers with access to computing resources. Such services provide access to computing and/or storage resources (e.g., storage devices providing either a block-level device interface, or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented at storage service may be made accessible, for example, from one or more physical or virtual machines implemented by another service.

Computer systems that provide services to customers may employ various techniques to protect the computer systems from a number of service requests that could potentially overload the computer systems. Furthermore, these computer systems may also employ various techniques to preserve customer data and customer experience during periods when the computer systems are overloaded or even experiencing failures. In general, a computer system is considered to be in an "overloaded" state if it is not able to provide the expected quality of service for at least some portion of customer requests it receives. Common solutions applied by overloaded computer systems include denying service to customers. In addition to this "overloaded" scenario, computer systems may also experience failure, including critical failure, power failure, or network failure.

To protect customer data against failures, customer data is often replicated across different computer systems. However, creating consistent replicas of customer data across a plurality of computer systems requires additional resources and requires consensus on customer data across the plurality of computer systems. Additionally, there is increased cost and time required to provision computer systems to maintain replicas of customer data. While such systems may maintain the integrity of customer data and mitigate the risk of loss, there may be a reduction in customer experience and delay in customers obtaining their data.

BRIEF DESCRIPTION OF THE DRAWINGS

Various techniques will be described with reference to the drawings, in which.

DETAILED DESCRIPTION

Figure 1:
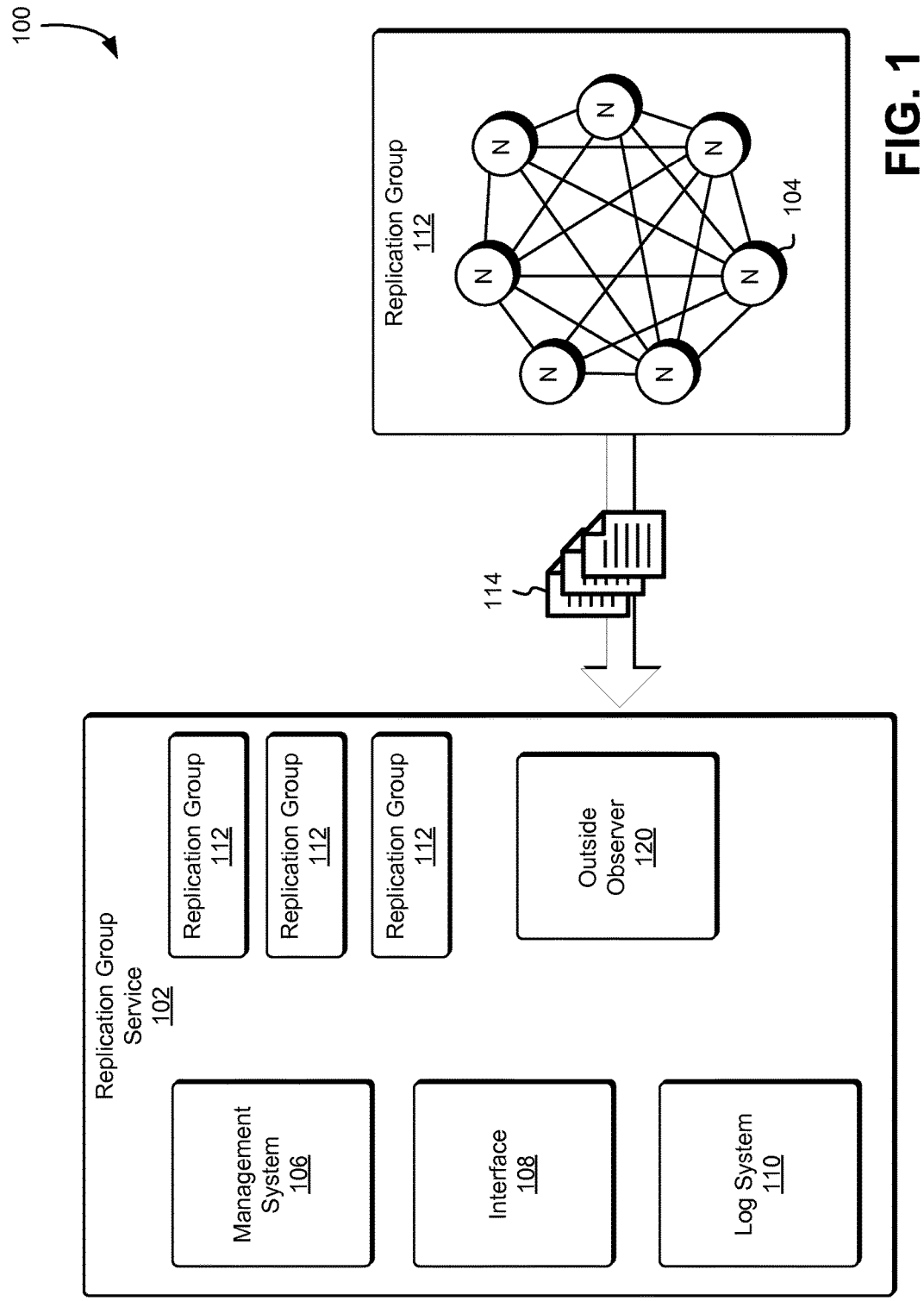
FIG. 1 illustrates aspects of a replication group which may be used to maintain replicas of data and provide consistency between the data replicas in accordance with at least one embodiment.

In various examples described below, logs generated by one or more data replication groups are collected, processed, and provided to various clients or outside observers. Furthermore, the logs may be configured to include information corresponding to an order of operations or chain of operations. For example, the format of the logs may be such that the previously committed operation is linked or otherwise associated with the current operation being performed. This information may be important in detecting errors in the data replication groups or the implementation of the data replication groups. For example, chaining operations so that the log indicates an operation committed immediately prior to the current committed operation, enables an outside observer to determine if a gap or other anomaly in the log, for a particular data replication group, was a result of an error or the result of a catchup algorithm or other learning algorithm. Gaps or other anomalies in the log may be valid if they are a result of a catchup algorithm.

In distributed computing systems, data replication reduces the risk of failure and mitigates possible data loss in the case of system failure. For example, a data replication group may include a clustered storage system for storing customer data, metadata about customer data, or other data across a plurality of physical hosts. This may reduce the risk of failure and increase availability of the data replication groups during network connection events and/or network connection issues or as a result of computer server failure and/or other failure of other computing resources supporting the data replication group.

A data replication group may consist of some number of nodes executed by one or more host computer systems, where the nodes implement a consensus protocol, such as Paxos, to enable consistent data replication between the nodes. In general, these data replication groups generated logs of in-flight (e.g., operations currently being processed) and committed operations. These logs, when containing committed operations, are referred to as operations logs. At least a portion of the operations included in the operations logs or other logs are used to perform state-machine transitions of the data replication groups (e.g., updating the value of a record in a key-value store), while other operations are used to perform heartbeats and other checks required to guarantee a data replication group's liveliness and/or validate the data replication group's health. Each committed operation recorded in the log may be assigned an operation number, and the operations numbers may be unique relative to the data replication group and may be continually increasing. In this manner the node may chain operation log numbers together in the log to indicate that a committed operation was executed immediately prior to another committed operation.

As described in greater detail below, a data replication group may consist of some number of nodes greater than or equal to one. The nodes may execute the operations and record the committed operations in a chain or other data format indicating an order of operations, as described in greater detail below. These logs may be provided to an outside observer to debug and perform error checking on the nodes of the data replication group and the consensus protocol implemented by the data replication group. The outside observer may include a computer system (e.g., an automated system performing an operation in connection with the logs), a human user, or some combination of both a computer system and a human user. As described above, the consensus protocol may provide guarantees that the data stored among the nodes is eventually consistent. The consensus protocol does not guarantee that at a certain point in time all the nodes of the data replication group implementing the consensus protocol will share an identical state. The consensus protocol may only guarantee that that the operations (e.g., state transitions) are made in the same order across all nodes of the data replication group. As a result, at various intervals of time there may be nodes of the data replication group missing operations or particular state transitions and therefore they require a catchup algorithm to achieve consistency. In these situations, a round robin unsupervised catchup algorithm may be used.

The unsupervised catchup algorithm may enable a plurality of nodes of the data replication group to obtain the current state of the data replication group. A particular node may become stale, for example, the particular node may not receive one or more proposals including operations to be committed by the data replication group. A node may determine that the node has become stale or has missed one or more messages and execute the unsupervised catchup algorithm described herein. The node may initialize a set of teachers which may include other nodes of the data replication group from which the node may obtain state information. The set of teachers may further include information suitable for communicating with the other nodes and performing learning operations with the other nodes. The node may then select teacher at random from the set and execute a learning operation, such as copying a snapshot of the teacher or obtaining a portion of the logs generated by the teacher. The node may continue to select teachers and perform learning operations until the node determines that the state of the node matches the current state of the data replication group.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a computing resource service provider operates a replication group service 102 configured to manage one or more data replication groups 112. Replication group service 102 may be configured as a clustered storage system for storing customer data or other data across a plurality of physical hosts. Such a clustered storage configuration may reduce the risk of failure and increase availability of the data replication groups 112 or particular nodes of the data replication groups 112 during network connection events and/or network connection issues. The data replication service 102 may maintain a plurality of data replication groups 112; in turn, each data replication group 112 may consist of a plurality of nodes 104. The data replication groups 112 may include replicated state machines or other storage systems configured to store data in a distributed computing environment.

In various embodiments, each node 104 is a process, executed by a server computer system or other computer system, described in greater detail below, which participates in one or more data replication groups 112. In addition, the server computer system may be configured with executable code or otherwise configured to perform the operations described herein performed by the management system and, in some embodiments, may be considered a separate management system or integrated with the management system. The collection of nodes 104 may implements the data replication group 112. For example, for a particular data replication group 112 implementing the Paxos consensus protocol, each node 104 of the data replication group 112 may implement one or more roles of the Paxos consensus protocol, such as the role of acceptor, proposer, and/or learner. In this manner, the nodes 104 of the data replication group may be responsible for the durability of customer data or other data maintained by the data replication group 112. Furthermore, during implementation of the consensus protocol the nodes 104 may generate logs 114. The log 114 may include information corresponding to the operation of the nodes 104 and/or data replication group 112. The logs 114 may be generated as a result of the operation of the consensus protocol, such as the Paxos consensus protocol. Furthermore, the logs may be in a format such that the operations included in the logs are linked or otherwise chained to other operations included in the logs.

An outside observer 120 may obtain the logs 114 and monitor the logs for errors. The outside observer may aggregate the logs 114 obtained from the nodes 104 of the data replication group 112 and detect errors in the implementation of the data replication group 112 based at least in part on inconsistencies between the logs 114 of various members of the data replication group. For example, the logs 114 may indicate that particular nodes 104 failed to perform certain operations or performed certain operations out of order. The outside observer 120 may be a process or other application executed by a server computer system operated by the computing resource service provider. In addition, the server computer system may be configured with executable code or otherwise configured to perform the operations described herein performed by the management system and, in some embodiments, may be considered a separate management system or integrated with the management system. Furthermore, the outside observer 120 may reconstruct the operations performed by the nodes 104 of the data replication group 112 from one or more segments of the logs 114. Reconstruction of the operations performed by the nodes may indicate gaps between operations included in the logs 114 or segments of the logs 114. These gaps, described in greater detail below, may be a result of several different factors. For example, the gap may be a result of a particular node copying over a snapshot of another node in order to achieve a consistent state across the nodes 104 of the data replication group 112. In another example, the gap may be a result of an error in the node 104 or the implementation of the consensus protocol that caused the node 104 to skip over the operation. The outside observer 120 may also be able to detect if the gap is a result of a log pusher or other computer system responsible for providing the logs to the outside observer 120 being delayed or failing. The log pusher is described in greater detail in a related U.S. patent application Ser. No. 14/957,421, entitled "DISTRIBUTED LOG PROCESSING FOR DATA REPLICATION GROUPS," incorporated by reference in its entirety herein for the purposes of the present disclosure.

As described above, the nodes 104 may implement the Paxos consensus protocol and the outside observer 120 may ensure that the Paxos consensus protocol executes correctly and may alarm or otherwise provide a notification if an error is detected. The Paxos consensus protocol may include a family of different protocols configured to solve consensus issues in a network of unreliable processors (e.g., computer systems and networks that are subject to possible failures). The Paxos consensus protocol is defined in "Consensus in the Presence of Partial Synchrony" by Cynthia Dwork, Nancy Lynch, and Larry Stockmeyer in the Journal of the ACM incorporated by reference in its entirety herein for the purposes of the present disclosure. The particular Paxos consensus protocol used, in an embodiment, ensures agreement on one result and/or one operation among a group of participants; for example, the nodes 104 of the data replication group 112. The Paxos consensus protocol may be used by replication service 102 and the data replication groups 112 to implement state machine replication and/or data replication in a distributed computing environment, such as a computing resource service provider environment 100 illustrated in FIG. 1.

Furthermore, the Paxos consensus protocol may define the set of actions which may be performed by the nodes 104 of the data replication groups 112 according to one or more predefined roles included in the Paxos consensus protocol: client, acceptor, proposer, learner, and leader. In some embodiments, a single node 104 of a particular data replication group 112 may implement one or more roles at any given time. For example, a particular node 104 may be a leader, acceptor, and learner in accordance with the Paxos consensus protocol. Furthermore, the actions performed by the node when executing a role may be included in the logs 114. In various embodiments, only committed operations (e.g., accepted proposals) as included in the logs 114 and proposals that are transmitted but never accepted are not included in the logs 114.

A client, which may include a computer system under the control of a customer of the computing resource service provider and/or application or other executable code executed by one or more other computer systems or services of the computing resource service provider, may issue requests to the data replication group 112 and/or replication service 102 and wait for a response. For example, the client may include a customer transmitting a storage request to an interface 108 of the replication service 102. The interface 108 may include a web-services front end or other computer system interface configured to receive an application program interface (API) request and process the API request and/or direct the API request to an appropriate computer system or service for processing. In another example, the client may include another service of the computing resource service provider issuing a request to store state information of the other service on behalf of a customer. The interface 108 may also provide access to the logs 114 of the data replication groups. Additionally, the replication group service may include a log system 110. The log system 110 may include various components, described in greater detail below, configured to obtain the logs 114 from the nodes 104, process the logs 114, and provide the logs 114 to the client, for example, enabling the client to query the logs 114 for particular events.

In accordance with the Paxos protocol, acceptors implemented by one or more nodes 104 of a data replication group 112 may be collected or assembled into groups, collectively referred to as quorums. In various embodiments of the Paxos protocol, any message sent to an acceptor must be sent to the quorum of the acceptor and any message received from an acceptor is ignored unless a copy is received from each acceptor in the quorum. A proposer, when implemented by a node 104 of the data replication group 112, may transmit proposals to acceptors; a proposal may include a message attempting to reach an agreement on a value and/or action by the acceptors. A learner, when implemented by a node 104 of the data replication group 112, may perform some action once an agreement is reached (e.g., transmit a response to the client). In general, any protocol that satisfies the consensus requirements of the replication service 102 and data replication groups 112 may be implemented in accordance with the embodiments described herein. Furthermore, in some embodiments, additional constraints may be placed on the consensus protocol implemented by the replication service 102 and data replication groups 112 as required. For example, the replication service 102 and data replication groups 112 may require the implemented consensus protocol to allow for the addition of a new member and/or node 104 to the data replication group 112 at some point in time after the initialization of the data replication group 112.

Additionally, the number of nodes 104 in the data replication group 112 may vary depending on the latency and durability requirements of the customer, other service of the computer system, or replication service 102. For example, the number of nodes 104 in the data replication 112 may be reduced if a particular service and/or customer requires reduced latency and response time. In contrast, if a customer and/or service requires higher fault tolerance and data durability, the number of nodes 104 in the data replication group 112 may be increased. A management system 106 of the data replication service 102 may be responsible for determining the number of nodes 104 in a particular data replication group. The management system 106 may be a process or other application executed by a server computer system. In addition, the server computer system may be configured with executable code or otherwise configured to perform the operations described herein performed by the management system and, in some embodiments, may be considered a separate management system or integrated with the management system. Furthermore, the management system 106 may be responsible for creation, termination, and assignment of the data replication groups. For example, the management system 106 may determine that a new data replication group is to be created and may communicate with one or more other services (not shown in FIG. 1 for simplicity) of the computing resource service provider in order to create the new data replication group 112. The management system 106 may also be responsible for assigning and/or associating a particular data replication group 112 to a customer or other service.

Returning to the log system 110 described above, logs 114 from the nodes 104 may be pushed to the log system 110 and/or a data store included and/or managed by the log system 110. From the log system 110 and/or data store, the logs 114 may be published to a stream or other information feed managed by a stream service, described in greater detail below. The stream service may allow clients to subscribe to the stream or other information feed and perform event driven operations based at least in part on information included in the stream or other information feed. For example, the client could receive an event indicating that a particular piece of data has been deleted for a particular data replication group 112 and could perform cleanup operations to delete associated data that is no longer needed. The log system 110 may aggregate the logs 114 obtained from various nodes 104 from a plurality of the data replication groups 112 managed by the replication group service 102. In another example, the log system 110 may aggregate the logs 114 obtained from the nodes 104 of the data replication group 112 of a particular network or zone, such as an availability zone or fault zone, which may allow customers to consume the event from a single stream. The logs 114 may be placed in a database or other data store maintained by the log system 110 and/or a computing resource service provider. The database or other data store may be queryable such that the client may query the log system 110, for example via the interface 108, for information corresponding to one or more data replication groups 112.

In one particular example, the data replication groups 112 may maintain state information corresponding to a current master storage device in a redundant data storage system. Clients can query to the database and/or log system 110 to determine information corresponding to the current master. In some embodiments, the value stored may be an internet protocol (IP) address of the current master. Other examples of a key-value store or other information maintained by the data replication groups 112 which may be determined from the logs 114 are within the scope of the present disclosure. Furthermore, as described above, the logs 114 generated by nodes 104 of the data replication groups 112 may be a product of the consensus protocol. As a result, the log may indicated operations performed by the nodes to replicate state across the data replication group. This enables clients to query the log system 110 in order to determine information maintained by the data replication group.

In some embodiments, the data replication groups 112 implement the Paxos consensus protocol; in such embodiments the logs 114 include at least the proposal number of committed operations. The proposal number may be a unique identifier, relative to the data replication group 112, and may be a continually increasing number (e.g., the proposal number may start with one and increase by some number greater than zero for each new proposal and no two proposals may have the same proposal number). The logs 114 could include any operation performed by the nodes, including heartbeat operations, and messages. The logs 114 could further include a timestamp or other time information. Furthermore, the logs 114 may include a result of the operation or whether the operation completed successfully. A log pusher may be executed on the server computer systems responsible for executing the nodes 104 and may, at the expiration of an interval of time, obtain one or more batches or segments of logs 114 persisted by the nodes 104 and transmit the logs 114 to the log system 110 and/or data storage device or other data storage system indicated by the log system 110.

The log system 110 may process the logs 114 for example, the log system 110 may delete health checks and heartbeat data included in the logs 114. The log system 110 could process the logs 114 to extract the key-value information and/or updates to the key-value information. The log pusher may maintain a cursor location or other location information corresponding to the last batch of logs 114 obtained from the nodes 114. Furthermore, the nodes 114 may maintain a ring buffer or other memory configured to automatically trim and/or delete logs 114 based at least in part on a trigger, for example, the expiration of an interval of time or the writing of a certain amount of data to memory. Furthermore, the log system 110 or other component of the replication group service 102, such as the management system 106, may cause the nodes 104 to implement a changing mechanism in the logs. The chaining mechanism may enable the outside observer 120 to reconstruct the operations performed by the nodes 104 as described above.

In various embodiments, the chaining mechanism causes the nodes 104 to generate a linked list of operations to include in the logs. For example, when an operation is performed by a particular node N at position i, the node may record the operation number corresponding to the performed operation in the log and may also record the last known operation number corresponding with the last performed operation. For example, say node N has an operation log containing the following operation numbers: [operation number 1, operation number 2, operation number 3, operation number 4], corresponding to the operation numbers of the performed operations. With the chaining mechanism the log may contain the following operation numbers: [operation number 1—operation number 0, operation number 2—operation number 1, operation number 3—operation number 2, operation number 4—operation number 3], where the second operation number is the operation number corresponding to the previous operation performed. The chaining mechanism is described in greater detail below.

In one example, if the node becomes stale or otherwise reaches a state inconsistent with the other nodes 104 of the data replication group, the node may execute a catchup algorithm to achieve a consistent state as described in greater detail below. Once the node achieves consistency, for example, by copying the state information directly from other nodes 104 of the data replication group or otherwise performing catchup operations, the operation log may containing the following operation numbers [operation number 1—operation number 0, operation number 2—operation number 1, operation number 3—operation number 2, operation number 4—operation number 3, operation number 10—operation number 4, operation number 11—operation number 10, . . . ]. The outside observer 120 may be configured to reconstruct or otherwise determine the operations performed by the nodes 104 of the data replication group based at least in part on this log information. As described in greater detail below, the outside observer 120 may be able to determine the cause for gaps in the log, such as the gap illustrated in the above example above, and provide information associated with the data replication group 122 to enable remedial operations.

Figure 2:
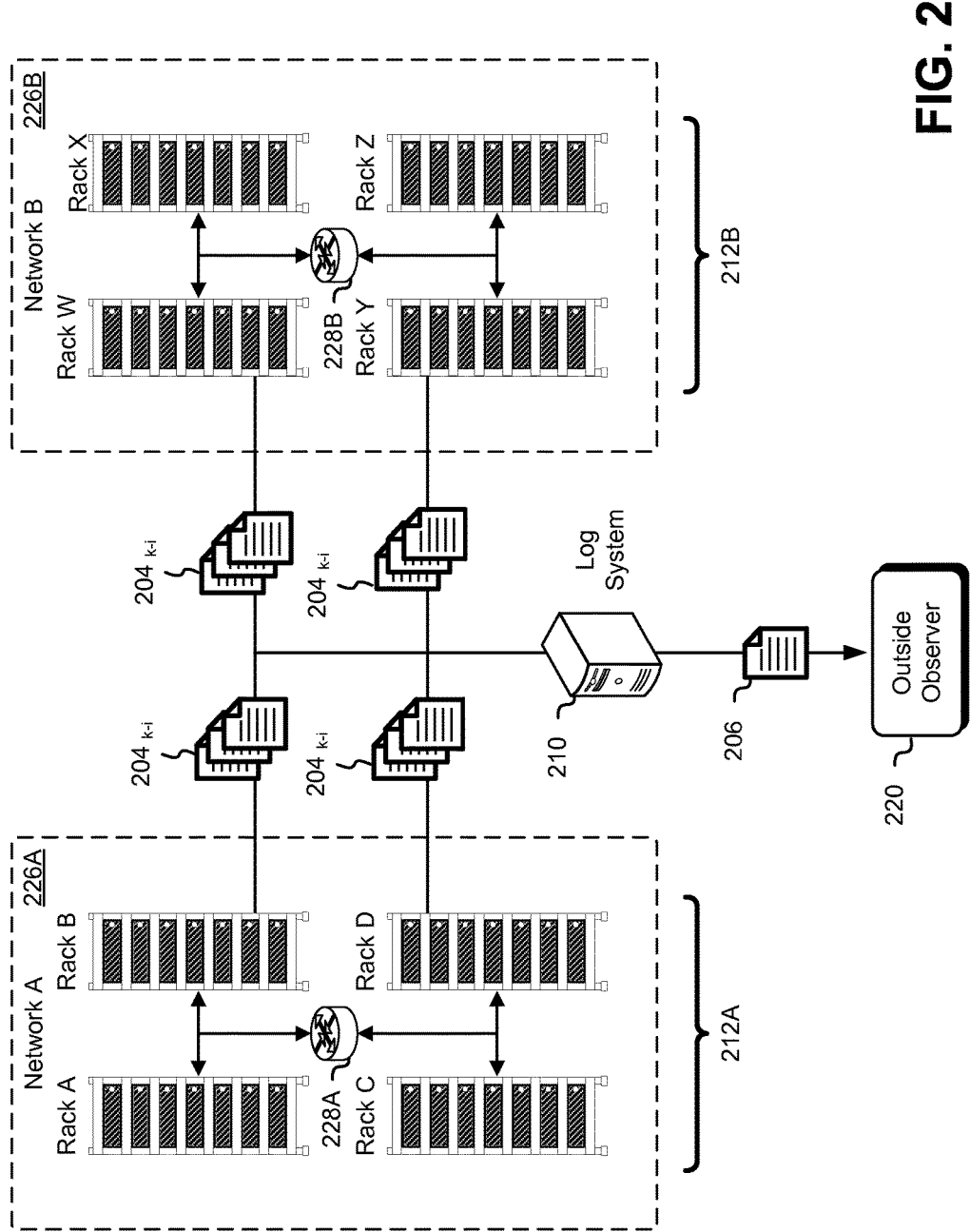
FIG. 2 illustrates an environment in which a set of replication groups may be configured to generate logs and provide the generated logs to an outside observer in accordance with at least one embodiment.

FIG. 2 illustrates an aspect of an environment 200 in which an embodiment may be practiced. Specifically, FIG. 2 depicts the collection and processing of logs 204 generated by nodes of data replication groups to enable outside observers 220 to perform analysis and error detection. The environment 200 may include a log system 210 that receives one or more logs 204 from nodes executed by servers in the sets of racks 212A and 212B. The nodes may be placed on the service according to a rack diversity constraint, where the sets of racks 212 may be localized by different networks 226A and 226B. The data collected by the log system 210 may include various logs $204_{k-i}$ obtained from different nodes executed by the servers in the sets of racks 212A and 212B. The log system 210 may be a computing system of one or more computing systems configured to obtain logs 204 generated by nodes of one or more data replication groups as described above in conjunction with FIG. 1. Furthermore, the log system 210 may include computer systems configured to process the logs 204 and generate processed logs 206 which may be consumed by an outside observer 220, for example, as a stream of data or as a log file in a particular format.

The sets of racks 212A and 212B may be physical hardware configured to host one or more servers, or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on). The servers in a rack may be members of a particular network. In some implementations, multiple racks of servers may be members of the same network. For example, as illustrated in FIG. 2, the servers of the set of racks 212A share the network 226A. Likewise, the servers of the set of racks 212B share the network 226B.

The networks 226A and 226B may be data communication pathways between one or more electronic devices. The networks 226A and 226B may be wired or wireless networks and may use any of a variety of communications protocols for organizing their network traffic. The networks 226A and 226B may allow the sharing of files, data, and other types of information between the one or more electronic devices accessible through the data communication pathways. Each of the networks 226A and 226B may be associated with a router, such as an aggregation router that aggregates the servers of the respective set of racks into the common network, separate from the router associated with the other network. Each of the networks 226A and 226B may be on a different subnet than the other network. For example, as illustrated in FIG. 2, the servers of the set of racks 212A may be commonly connected to a router 228A. Similarly, the servers of the set of racks 212B may be commonly connected to a router 228B. The routers 228A and 228B may be networking devices that forward packets between computer networks, such as between the networks 226A and 226B.

The log system 210 may also include a data warehouse or data storage system that stores the processed logs 206 and/or the logs $204_{k-i}$ such that the logs may be queried. In this manner, the outside observer 220 may be able to query the processed logs 206 and/or the logs $204_{k-i}$ for information as well as being provided information corresponding to the processed logs 206 and/or the logs $204_{k-i}$ through a data stream or other mechanism for providing the data to the outside observer 220. In various embodiments, the data stream includes the processed logs 206 and/or the logs $204_{k-i}$. The outside observer 220 may be a computer system operated by a user and/or technician, for example, a technician of a computing resource service provider may operate the outside observer 220 in order to debug the nodes implementation of the consensus protocol.

Additionally, outside observer 220 may be another service or computer system of the computing resource service provider. For example, nodes of the data replication groups executed by the servers on racks 212A and 212B may store data on behalf of customer computer systems, the outside observer 220 may be a service of the computing resource service provider configured to detect errors in the nodes and alert the customer or computing resource service provided to the errors may be mitigated. In order to determine errors in the operation of the nodes of the data replication group, the outside observer 220 may query the log system 210 for information associated with the data replication group, for example, by querying for a particular log segment or set of logs generated by nodes of a data replication group.

The outside observer 220 may include logic, such as software or other executable code, configured to determine, based at least in part on the processed logs 206 and/or the logs $204_{k-i}$, if an error has occurred. The processed logs 206 and/or the logs $204_{k-i}$ may include operation number organized based at least in part on a chaining mechanism. The determination may then be made whether there has been an error in the operation of the nodes based at least in part on the chained operation numbers included in the processed logs 206 and/or the logs $204_{k-i}$. In addition, the outside observer 220 may be configured to determine additional information if an error is detected. For example, the outside observer 220 may determine a cause for the error, a node at which the error has occurred, a network associated the error, server computer systems associated with the error, or any other information suitable for aiding in resolving the error.

Figure 3:
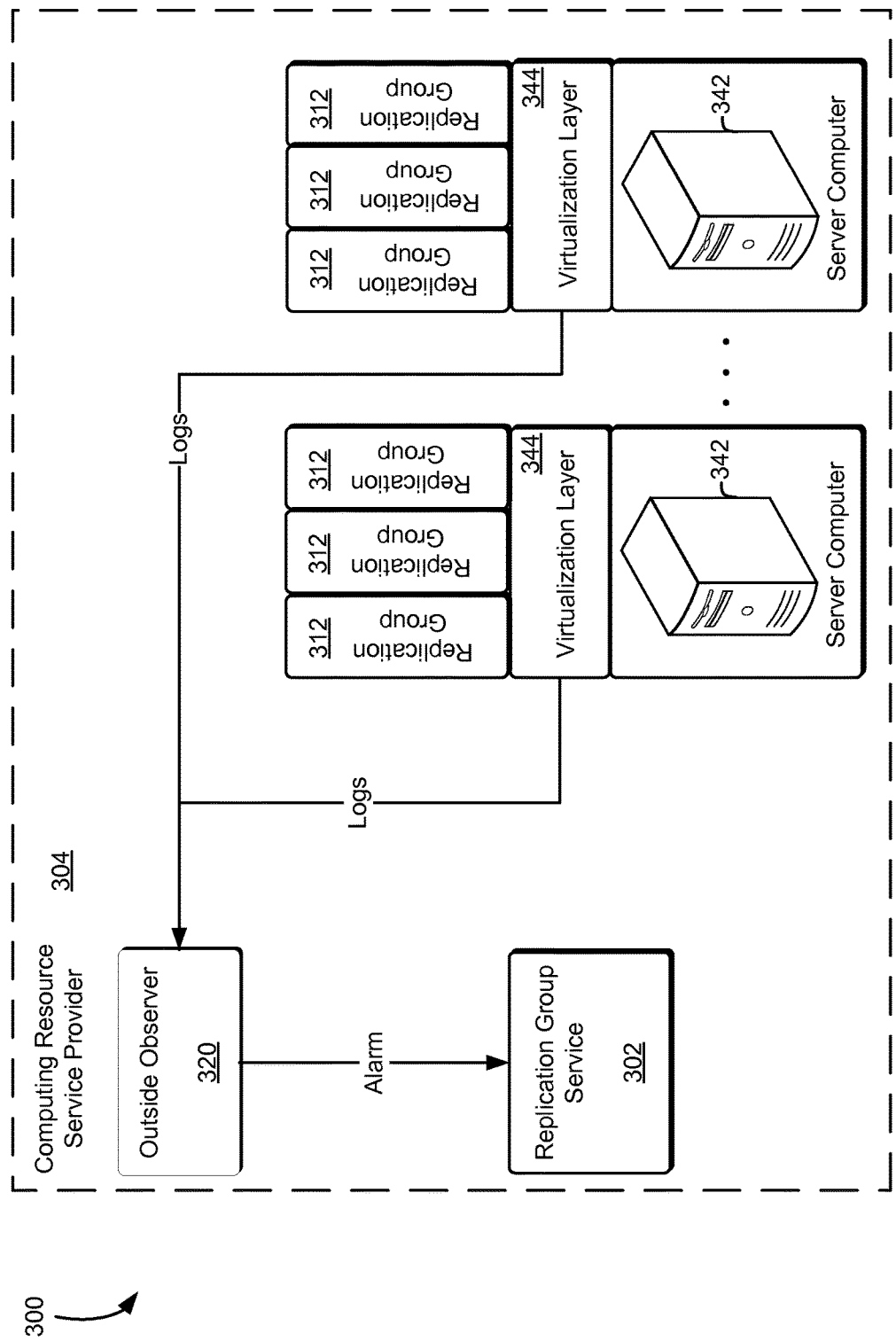
FIG. 3 illustrates an environment in which a set of replication groups may be configured to generate logs and provide the generated logs to an outside observer in accordance with at least one embodiment.

FIG. 3 illustrates an environment 300 in which a replication group service 302 of a computing resource service provider environment 300 in accordance with at least one embodiment. The replication group service 302, which may be implemented by physical hardware, is used by a computing resource service provider 304 to provide durable storage resources for customers and/or other services of the computing resource service provider 304. The replication group service 302 may include a group of computing systems, such as the server computers 342 described in detail below, configured to manage and provide data replication groups 312 for use by customers or other services of the computing resource service provider 304. The physical hardware may include a server computer 342. The server computer 342 may be any device or equipment configured to execute instructions for performing data computation, manipulation, or storage tasks, such as a computer or a server. A server computer 342 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 344 may include a bare metal hypervisor or a hosted hypervisor. The virtualization layer 344, executing on the service computer 342, enables the physical hardware to be used to provide computational resources upon which one or more data replication groups 312 and/or component thereof such as a node, master node, or new node as described above may operate. For example, the virtualization layer 344 enables a particular node of a data replication group 312 to access physical hardware on the server computer 342 through virtual device drivers or other executable code on the node. The virtualization layer 344 may include a hypervisor or virtualization software and/or hardware. The virtualization layer 344 may also include an instance of an operating system dedicated to administering the data replication group 312 or component thereof running on the server computer 342. Each virtualization layer 344 may include its own networking software stack, responsible for communication with other virtualization layers 344 and, at least in some embodiments, also responsible for implementing network connectivity between the data replication group 312 or components thereof running on the server computer 342 and other data replication group 312 running on other server computers 342.

Furthermore, the server computer 342 may host multiple virtualization layers 344 of the same or different types on the same server computer 342 as well as data replication groups 312 of the same or different types. For example, a server computer system 342 may host a first node of a first data replication group 312 and may host a second node that is a member of a second data replication group 312. The virtualization layer 344 may be any device, software, or firmware used for providing a virtual computing platform and/or virtualized computing resources for the data replication group 312 and/or component thereof. The virtual computing platform may include various virtual computer components, such as one or more virtual CPUs, virtual memory, and the like. The data replication group 312 may be provided to the customers or other service of the service provider 304 and the customers may store data or other information on the data replication group 312 or component therefor. Further, the computing resource service provider 304 may use one or more of its own data replication group 312 for supporting execution of its applications and providing storage for such applications.

Commands and other information may be included in an application program interface (API) call from the replication group service 302 or an outside observer 320, described in greater detail below, to the virtualization layer 344. The replication group service 302 enables the customers and other services of the computing resource service provider 304 to manage and operate the data replication group 312. The outside observer 320 may transmit a request to the replication group service 302 to obtain log information corresponding to a particular data replication group 312 or may obtain the log information directly from the particular data replication group 312. The request may be an API call including information corresponding to a customer, the outside observer 320, or the particular data replication group 312. In various embodiments, the replication group service 302 determines the corresponding virtualization layer 344 for the data replication group 312 included in the request and transmits a command to the virtualization layer 344 to obtain operation logs stored locally by the data replication group 312.

A log pusher (not shown in FIG. 3 for simplicity) may be used to obtain logs stored locally by the data replication groups 312. In various embodiments, the log pusher obtains logs from the data replication groups and stores the logs in one or more storage devices of a storage service accessible to the outside observer 320. The log pusher may be a process or other executable code supported by the virtualization layer 344. The storage service may be a group of computer systems configured to store data that is accessible to one or more other computer systems, such as the replication group service 302. In this way, log information maintained by the storage service may be accessed by the replication group service 302 and/or the outside observer 320. The outside observer 320 may be a group of computer systems as described above configured to monitor the logs and detect errors based at least in part on the monitored logs. A data storage service and/or data storage device is queryable if the data storage system and/or the data storage device enable requestors to submit data queries and receive responses to the submitted data queries. For example, the storage service may include a database, such as a Structured Query Language (SQL) database, which enables the outside observer to query the storage service for information contained in the logs and stored by the storage service. In another example, the storage service may be non-queryable, in so much as, the storage service stores the log files as data objects which are obtainable by a data object identifier, such as a file name or key, but does enable queries on information contained in the log files.

The replication group service 302 may be responsible for receiving alarms from the outside observer 320 in the case of an error or other issue with the data replication groups 312. The outside observer 320 may detect errors in the log and transmit information to the replication group service indicating that an error exists in one or more data replication groups 312. In various embodiments, the replication groups service, upon receiving an alarm from the outside observers, obtains additional information from the data replication groups and provides the obtained information and other information associated with the error to a technician or other responsible party of the computing resource service provider. The obtained information and other information associated with the error may be provided to a network address (e.g., email, ticketing system, etc.) associated with a technician. The technician or other responsible party of the computing resource service provider may then perform operations to mitigate the error. For example, the information associated with the error and the obtained information may indicate an error in the implementation of the consensus protocol by the data replication group 312 which may require the software or other executable code associated with the consensus protocol to be modified in order to correct the error.

Figure 4:
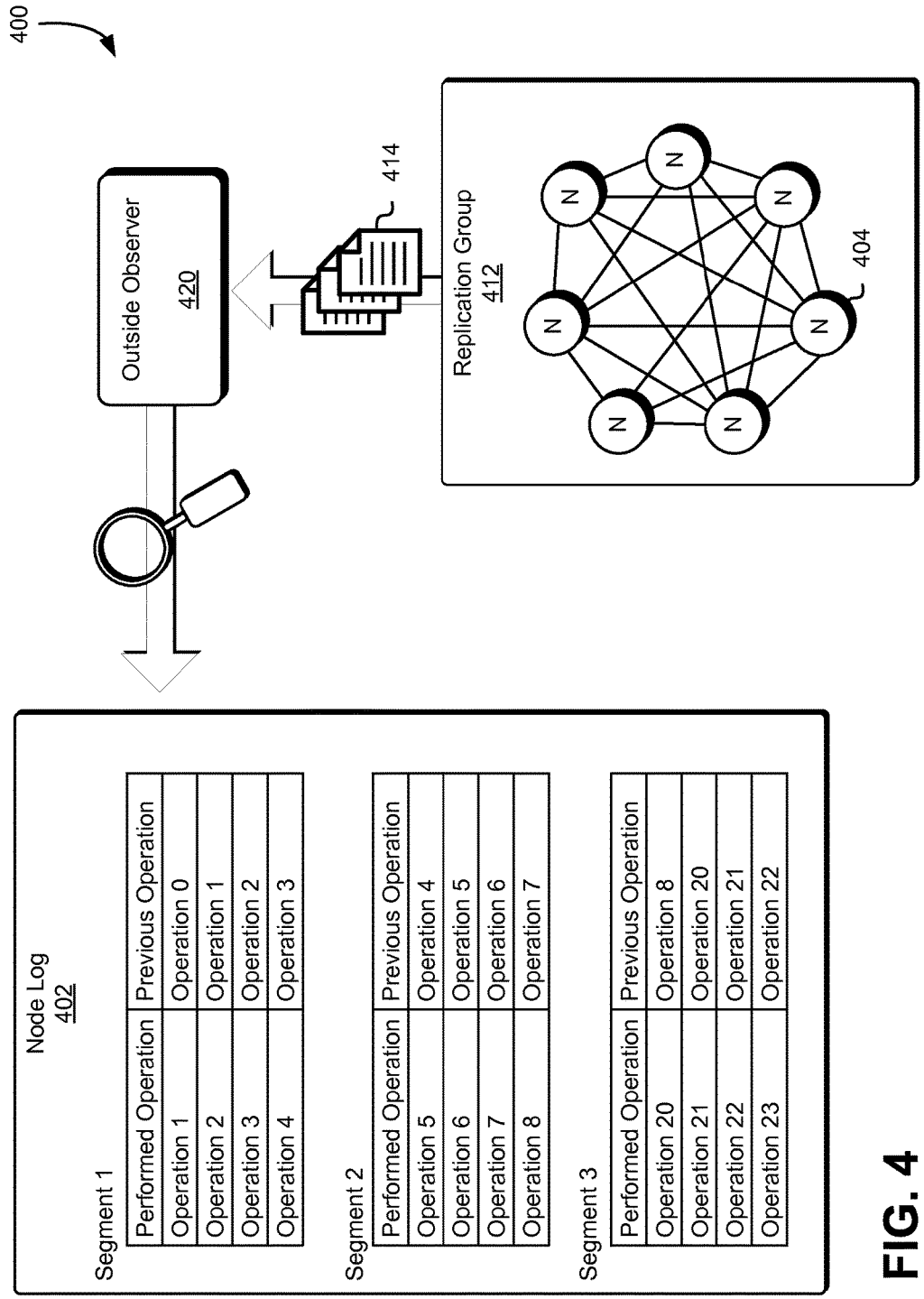
FIG. 4 illustrates an environment in which a set of replication groups may be configured to generate logs and provide the generated logs to an outside observer in accordance with at least one embodiment.

FIG. 4 illustrates an environment 400 in which log information generated during the operation of data replication groups may be analyzed and/or monitored to determine if errors have occurred during the operation of the data replication groups. A data replication group 412 may consist of one or more nodes 404, as described above. The nodes 404 may implement a consensus protocol, such as the Paxos consensus protocol, in order to durably store data in a distributed computing environment. In addition the nodes 404 may generate and store locally, relative to the node, one or more logs 414. The nodes 404 may be an application, process, or other executable code that, when executed by one or more processors of a computer system, causes the computer system to preform various operations in accordance with the execution of the data replication group 412.

The logs 414 may be generated as part of the execution of the data replication group 412, for example, as part of the Paxos consensus protocol. The logs 414 may be used for keeping track of all updates to the data replication group 412, such as read and/or write operations performed by the data replication group 412. Furthermore, each node 404 of the data replication group 412 may maintained a node log 402. The node log 402 may be a log of operation performed by the particular node generating the node log 402 and may be stored locally relative to the particular node. In various embodiments, operations in the logs 414 will at various intervals of time be committed to the nodes 404 (e.g., the particular replica of the state machine) based at least in part on an order the operations appear in the logs 414. Furthermore, the data replication group 412 may be configured to ensure that the various properties of the data replication groups 412 and the logs 414 are maintained. For example, the data replication group 412 may ensure that operation X at position i in the node log 402 is always committed prior to Operation Y at position i+1 in the node log 402. Additionally, if operation X is committed on a particular node, then the data replication group 412 may ensure that operation X is committed on all nodes 404. Finally, if operation X is at position i of the node log 402 stored by the particular node, then X is at position i of the logs 414 for all nodes 404.

Although the data replication groups 412 may maintain the properties described above, messaging failures, data replication group 412 configuration changes, and other conditions may cause nodes 404 of the data replication group 412 to become out of sync (e.g., maintain a different state of the state machine at a giving interval of time). As discussed above, a learning and catchup algorithm may be employed by the data replication group 412 to deal with these issues. The learning and catchup algorithms, described in greater detail below, may attempt to bring a particular node up to date by copying operations from the logs 414 to the node log 402 of the particular node (e.g., copying, to the local log, operations from the logs 414 of other nodes 404 that are missing from the local log). However, in various embodiments, due to resource limitations, the data replication group will periodically delete operations from the logs 414 (e.g., from the node log 402). As a result, node 404 may not be able to obtain all operations from the logs 414, and therefore may need to copy a snapshot of one or more nodes 404 of the data replication group.

In addition, the nodes 404 may use a chaining mechanism when generating the node logs 402 in order to enable an outside observer 420 to determine if an error has occurred and/or that the operation of the data replication group 412 is occurring correctly. For example as illustrated in FIG. 4, the node log 402 may include a performed operation and a previous operation. The performed operation included in the node log 402 may include information corresponding to an operation performed by the node at a particular point in time. For example, the information may include a proposal number (e.g., a proposal number according to the operation of the Paxos consensus protocol) or other unique identifier relative to the data replication group 412. In addition, the log may include a timestamp or other additional information not shown in FIG. 4 for simplicity. The chaining mechanism may further link or otherwise associate the performed operation with a previously performed operation.

The previous operation may include an operation performed immediately prior to the operation indicate by the performed operation information included in the node log 402. For example as illustrated in FIG. 4, operation 0 was the operation performed immediately prior to operation 1 as indicated by the node log 402. Various intervals of time may have elapsed between the executing of operation 0 and operation 1 but no other operation were performed by the node 404 between the execution of operation 0 and operation 1. Furthermore, the node log 402 may be split or otherwise divided into segments as illustrated in FIG. 4. The node log 402 may be divided into segments by operation of the outside observer 420 during monitoring and analysis of the node log 402 or as a result of a log pusher obtaining the logs in batches from the data replication group 412 and providing the batches to the outside observer 420. In various embodiments, the node log 402 does not include segments.

In performing monitoring and other operation of the node log 402, the outside observer 420 may organize the node log 402 by segments to determine if gaps in the node log 402 are a result of an error or valid operation of the data replication group 412, such as a catchup algorithm. FIG. 4 illustrates a gap between operation 8 and operation 20. Specifically, operation 9 through operation 19 is missing from the node log between segment 2 and segment 3. As described above, the operation number may be configured to increase by a certain value for each operation performed and no two operations may have the same operation number. In the example illustrated by FIG. 4, the operation number increased by a value of 1 for each operation performed. Returning to the example, the outside observer 430 may determine that the gap in the node log 402 is valid as a result of the chaining mechanism indicating that the previous operation performed prior to operation 20 was operation 8. This may indicate that the data replication group 412 implemented a learning or catchup algorithm correctly, described in greater detail below. For example, the node 404 may have lost or otherwise not received messages corresponding to operation 9 through operation 19, determining that the node 404 had become stale, and copied over a data from one or more other nodes corresponding to the performance of operation 9 through 19. Furthermore, the outside observer 420 may determine a cause for the gap in the node log 402 and/or may obtain additional information corresponding to the gap. For example, the outside observer 420 may determine the gap was a result of node 404 failure, network delay or failure, or other occurrence that caused the node 404 not to receive messages corresponding to operation 9 through operation 19.

Figure 5:
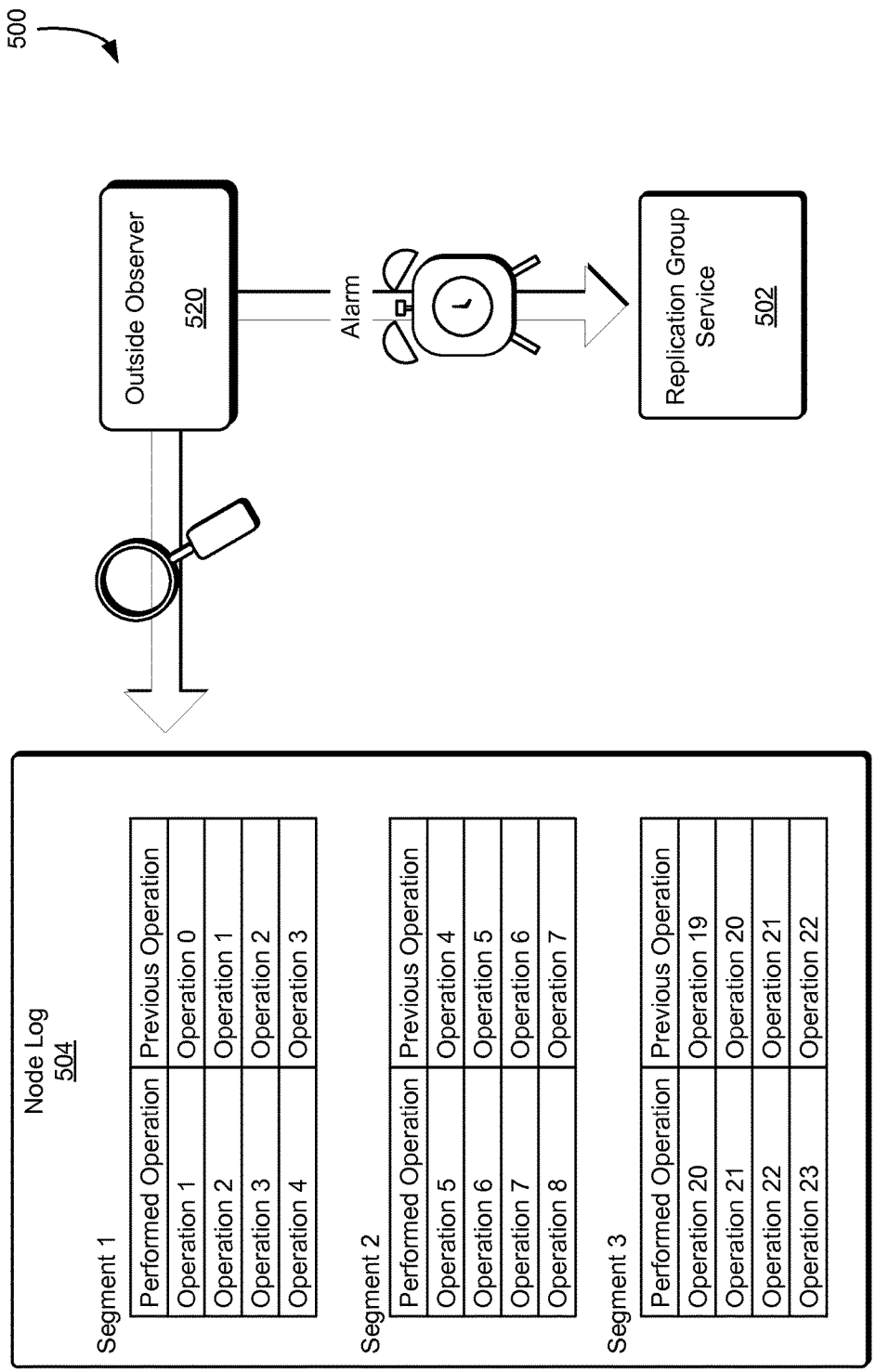
FIG. 5 illustrates an environment in which a set of replication groups may be configured to generate logs and provide the generated logs to an outside observer in accordance with at least one embodiment.

FIG. 5 illustrates an environment 500 in which log information generated during the operation of data replication groups may be analyzed and/or monitored to determine that one or more errors have occurred during the operation of the data replication groups and an alarm may be triggered. An outside observer 520 may obtain the log for a data replication group or nodes thereof as described above. The outside observer 520 may be configured to reconstruct the operation of various nodes of the data replication group based at least in part on the obtained log information. For example, the outside observer 520 may be configured to organize the operation performed by a particular node of the data replication group in order based at least in part on an operation number and determine if the particular node performed the operation in the correct order. As described above, in order to maintain the correct state, the node may be required to perform the operation of the data replication group in the order indicated by the operation numbers (e.g., operation 2 must be performed before operation 3 which must be performed before operation 4 etc. . . . ).

If an error or other anomaly is detected by the outside observer, an alarm or other message may be transmitted to a replication group service 502. As described above, the replication group service 502 may include a group of computer systems configured to implement and manage data replication groups. In various embodiments, the data replication service 502 includes one or more computer systems configured to troubleshoot or otherwise correct errors in the operation of the data replication groups managed by the replication group service 502. In a specific example, the alarm received by the replication group service 502 may cause the replication group service 502 to provide information to a technician in order to debug the operation of the data replication group associated with the alarm.

In the example illustrated in FIG. 5, the alarm may be transmitted as a result of a gap in a node log 504. The node log 504 may be a log of operation performed by a particular node of the data replication group. The gap illustrated in FIG. 5 is between segments 2 and 3 and operation 8 and operation 20 (e.g., the node log 504 does not contain operation 9 through operation 19). This gap may be a result of an error or a catchup algorithm as described above. In the example illustrated in FIG. 5, the gap may be a result of an error as indicated by the chaining mechanism used by the node of the data replication group in generating the node log 504. Specifically the chaining mechanism may indicate that the operation performed prior to operation 20 was operation 19, however this may indicate an error because the previous operation in the log was operation 8 and not operation 19.

The outside observer may obtain 502 additional information to determine if the gap indicates an error, or if the gap is merely a result of a delay, or failure in delivery of the segments of the node log 504 corresponding to the missing operation. If the node responsible for generating the node log 504 committed operation 19 prior to operation 9 through operation 18 as indicated by the node log 504, the outside observer may transmit error information to the replication group service 502. The error information may indicate an error in the execution of the consensus protocol between the nodes of the data replication group that caused the node to perform the operations of the data replication group out of order.

Figure 6:
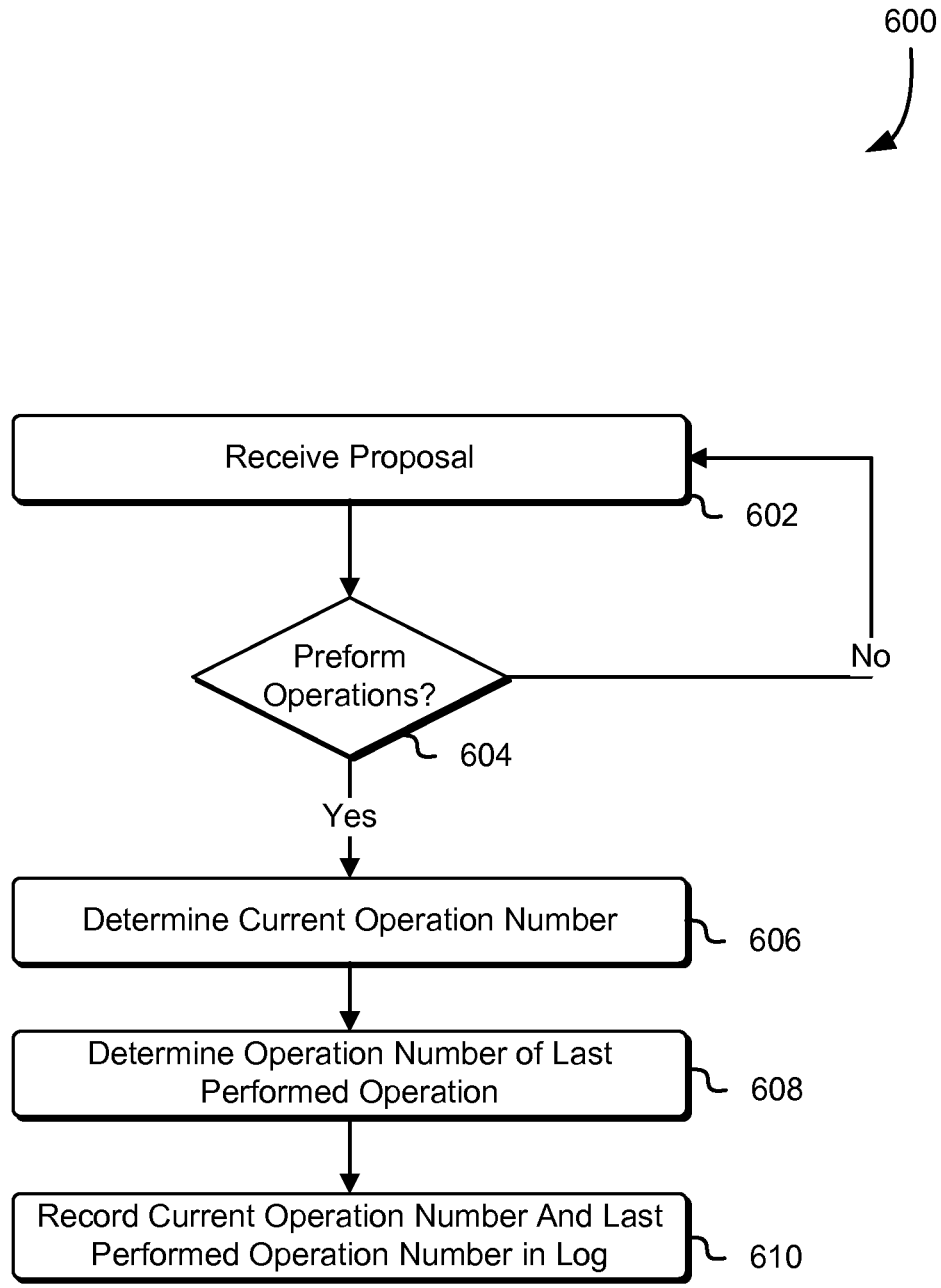
FIG. 6 shows an illustrative process which may be used to create a log by a node of a data replication group in accordance with at least one embodiment.

FIG. 6 is a block diagram illustrating an example of a process 600 for generating a log of operations utilizing a chaining mechanism to track operations of a node of a data replication group in accordance with at least one embodiment. The process 600 may be performed by any suitable system, such as a node of a data replication group as described above in connection with FIG. 1. The process 600 includes receiving a proposal 602. The proposal may be received during the executing of a consensus protocol between the nodes of the data replication group as described above. The proposal may include an operation to be performed by the node receiving the proposal. The node may determine, based at least in part on the received proposal, if an operation is to be performed 604. If no operation is to be performed, then process may receive additional proposals. If the node determines an operation is to be performed, the node may determine a current operation number 606.

The current operation number may correspond to a proposal number included in the received proposal. In another example, the proposal number may be a unique number relative to the data replication group and may be continuously increasing for each executed operation (e.g., 1, 2, 3 . . . ). The node may then determine the operation number associated with the last performed operation 608. The node may maintain this information in the log or may maintain the last performed operation number in memory separate from the log. For example, the operation number of the previously performed operation maybe stored in the local log of the node. The node may then record the current operation number and the last performed operation number in the log 610. The current operation number and the last performed operation number may be recorded in the log such that the current operation number and the last performed operation number are chained as described above in connection with FIGS. 4 and 5. In numerous variations of the process 600, the current operation number and the last performed operation number may be recorded in a linked list such that the log indicates that the operation associated with the last performed operation number was executed, by the node, immediately prior to the operation associated with the current operation number.

Figure 7:
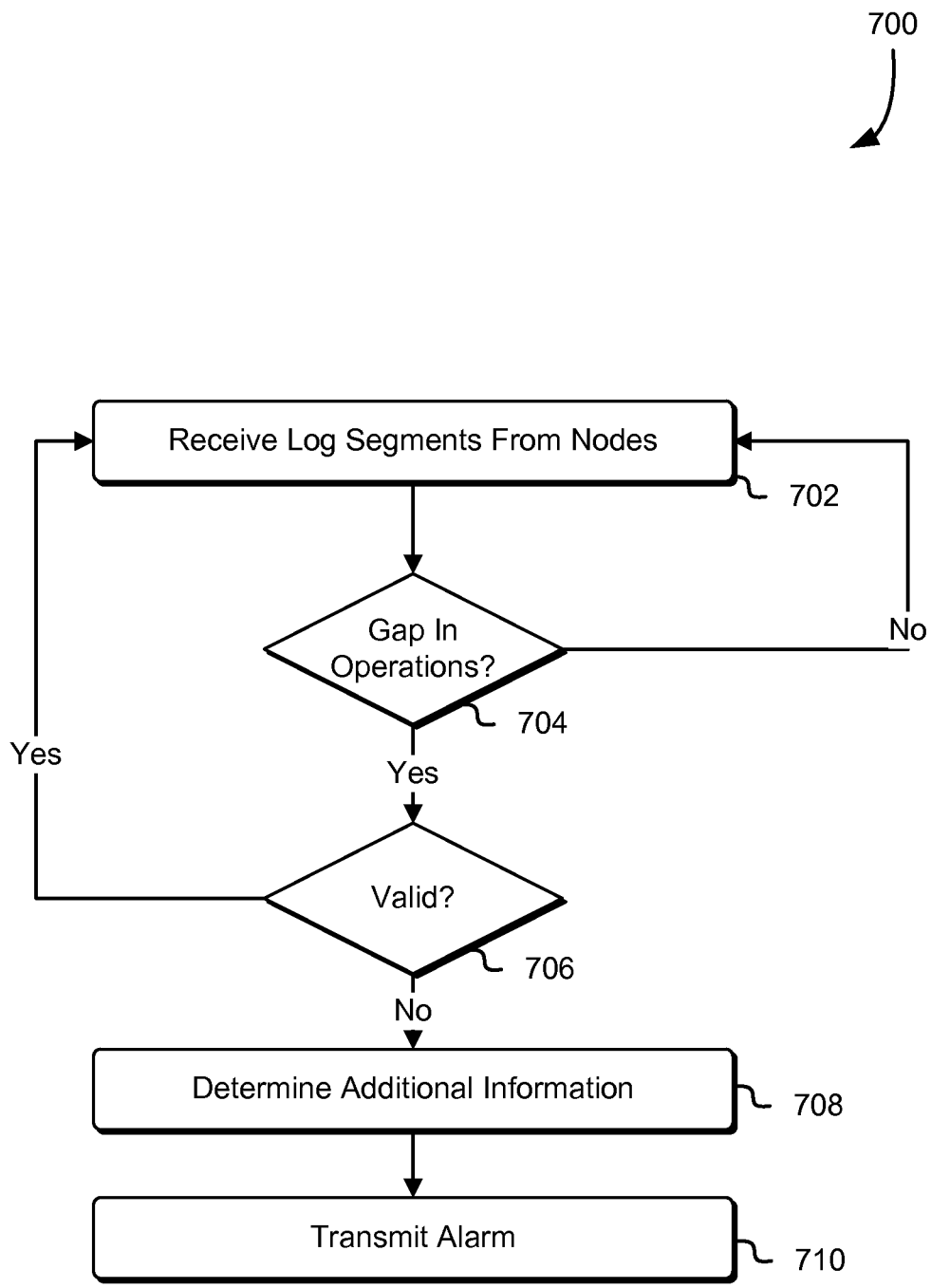
FIG. 7 shows an illustrative process which may be used to detect an error in a node of a data replication group accordance with at least one embodiment.

FIG. 7 is a block diagram illustrating an example of a process 700 for detecting an error in the operation of a data replication group by monitoring logs generated by nodes of the data replication group in accordance with at least one embodiment. The process 700 may be performed by any suitable system such as an outside observer as described above in connection with FIGS. 1 and 5. The process 700 includes receiving log segments from one or more nodes 702. The logs received from the nodes may be distributed by one or more intermediaries, such as the log pusher, log collector, log processors, or stream service as described above. Furthermore, the logs may be organized into segments or batches, for example, to allow for more efficient collection and transmission of the logs.

The outside observer may receive the logs and determine if there is a gap in the operations recorded in the log 704. For example, the outside observer may reconstruct the operations performed by the node by ordering the operations in the log based at least in part on an operation number as described above. Additionally, the log may include an operation number organized using a chaining mechanism such that the operation numbers included in the log are associated with an operation number of an operation performed immediately prior. If there is no gap in the log, the outside observer may continue to receive additional log segments. However, if there is a gap in the operations in the logs, the outside observer may determine if the gap is valid 706. The outside observer may determine if the gap is valid based at least in part on the information included in the log as described above in connection with FIGS. 4 and 5.

If the outside observer determines that the gap is valid, the outside observer may continue to receive additional log segments. However, if the outside observer determines that the gap is invalid, the outside observer may determine additional information 708. For example, if the log indicates that operations of the data replication groups are executed out of order by the node responsible for generating the log, the outside observer may determine information associated with the data replication groups, nodes, consensus protocol, or other information suitable for mitigating the error indicated in the log. The outside observer may then transmit an alarm to a replication group service or other entity 710. The alarm may include the determined additional information. Furthermore, the alarm may be transmitted or monitored by a technician responsible for mitigating errors in the execution of the data replication groups.

Figure 8:
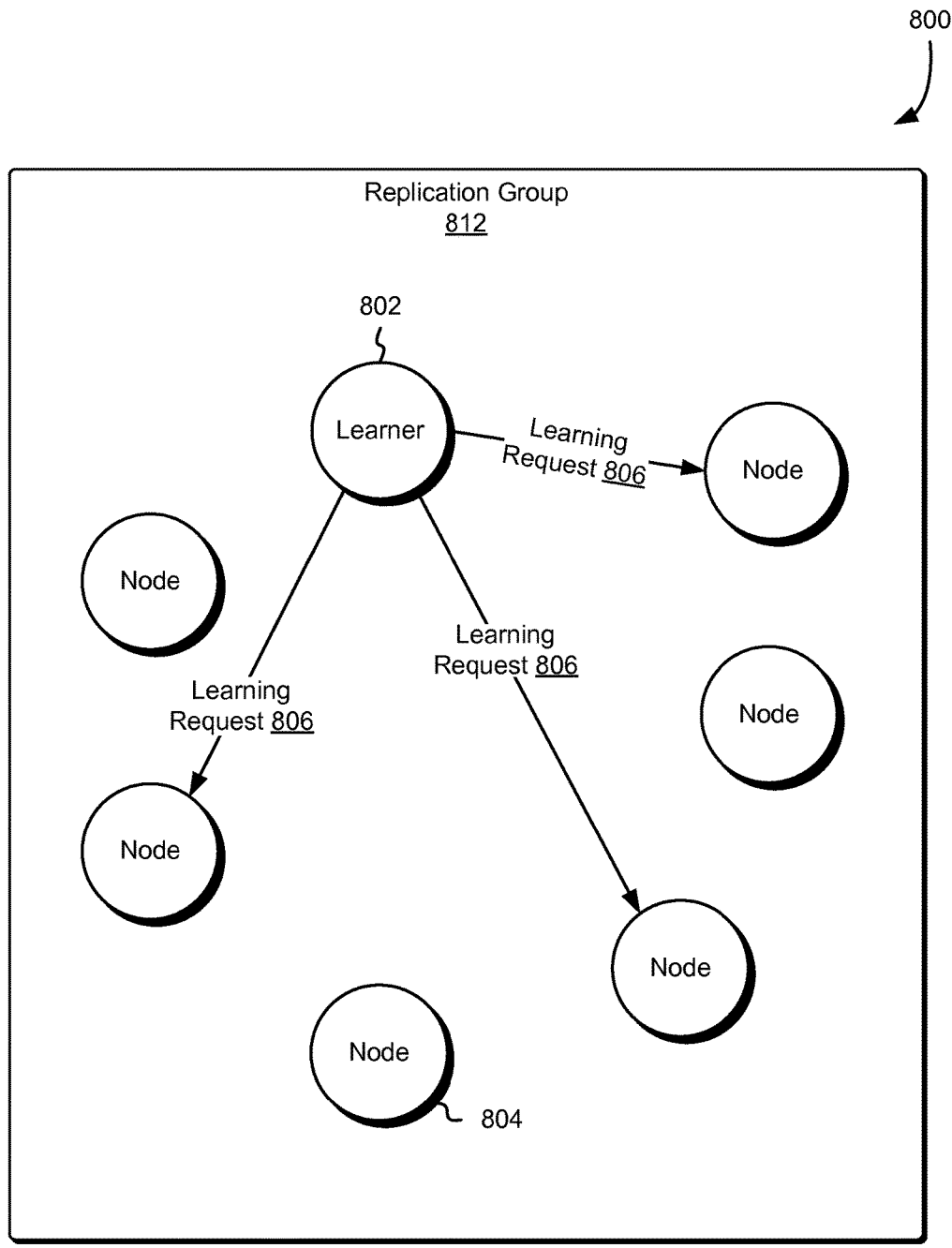
FIG. 8 illustrates an environment in which a set of nodes of a data replication group may be configured to execute a catchup algorithm in accordance with at least one embodiment.

FIG. 8 illustrates an environment 800 in which a data replication group 812 may implement a catchup algorithm of a consensus protocol between one or more nodes 804 of a data replication group 812 in accordance with at least one embodiment. In addition, at least one node 804 of the data replication group 812 may be a learner 802. The learner 802 may be a node of the data replication group 812 that has determined that state of the node is stale or otherwise behind the state of other nodes 804 of the group and execution of a catchup algorithm is required to match the current state of the data replication group 812. Each node 804, including the learner 802, may be software or other executable code maintained in the memory of a physical host or other server computer system and executed by the physical host or other server computer system in order to provide the functionality described herein. Furthermore, the nodes 804 and learner 802 may be executed by one or more distinct physical hosts or other server computer systems. For example, two nodes 804 of the data replication group 812 may be executed by a first physical host and the remaining nodes 804, including the learner 802, of the data replication group 812 and may be executed by a second physical host. The physical hosts are described in greater detail below.

The nodes 804 and learner 802 of the data replication group 812 may be connected through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 804 and learner 802 may be distributed across physical hosts and networks such that failure of one or more networks or physical hosts does not cause all of the nodes 804 of the data replication group 812 to fail. Although six nodes 804 and one learner 802 are illustrated in FIG. 8, any number of nodes 804 and leaners 802 may be included in the data replication group 812 and distributed across a plurality of distributed computer systems in accordance with the present disclosure. For example, five nodes 804 of the data replication group illustrated in FIG. 8 may be learners executing a catchup algorithm.

The data replication group 812 may further include software or other executable code configured to manage the operation of the data replication group 812, nodes 804, and/or learner 802. Managing the operation of the data replication group 812 may include creating new nodes 804, replacing failed nodes 804, providing discovery of nodes, backing up data maintained by the nodes 804, determining roles of the consensus protocol to be performed by the nodes 804, executing a catchup algorithm, and other such operations as required to ensure the functioning of the data replication group 812. The data replication group 812, illustrated in FIG. 8, may be used in connection with various embodiments described herein. For example, the data replication group 812 may be a member of a pool of data replication groups described above in connection with FIG. 1. In various embodiments, the learner 802 may determine staleness based at least in part on receipt of a heartbeat operation from a master node or other node of the data replication group. For example, the data replication group may be configured such that a master node transmits a heartbeat message every 2 milliseconds to ensure communication between the nodes. Therefore, if a node does not receive a heartbeat message at the expiration of an interval of time the node may execute a catchup algorithm to determine if the node is stale.

The learner, as illustrated in FIG. 8, may execute an unsupervised catchup algorithm. For each learner 802 of the data replication group 812, the learner may initialize a set of nodes 804 to learn from. The set of nodes 802 to learn from may include the original members of the data replication group 812 or may include an updated membership of the data replication group based at least in part on information included in the log. If the learner is a new node and does not have membership information the learner may determine the membership information and include the membership information in the set of nodes 804 to learn from. The learner 802 may then randomly or pseudorandomly select a particular node from the set of nodes 804 to learn from. The learner may then transmit a learning request 806 to the selected node.

The learner 802 may then receive, in response to the learning request 806 from the selected node, a log or other information from the node that may enable learner 802 to copy and/or replicate the state of the selected node. In various embodiments, the logs of the nodes 804 may have been trimmed or otherwise deleted in order to reduce the amount of computing resources used by the nodes 804, in such cases, the learner 802 may simply copy the state of the node (e.g., obtain a snapshot of the node and copy the snapshot over to the memory of the learner 802). After copying the state of the selected node the learner 802 may continue the catchup algorithm. For example, the learner 802 may select another node from the set of nodes 804 to learn from. In various embodiments, the unsupervised catchup algorithm may include a round robin element. Specifically, learner 802 may remove the selected node from the set of node 804 which may be learned from. The learner 802 may continue to transmit learning request and check for staleness until the learner 802 has determined that the state of learner 802 matches the state of the data replication group 812. Other catchup and/or learning algorithms may be used in accordance with the present disclosure, such as a random learner, designated learner, hierarchical learner, circular learner, full learner, or other suitable learning algorithm.

Figure 9:
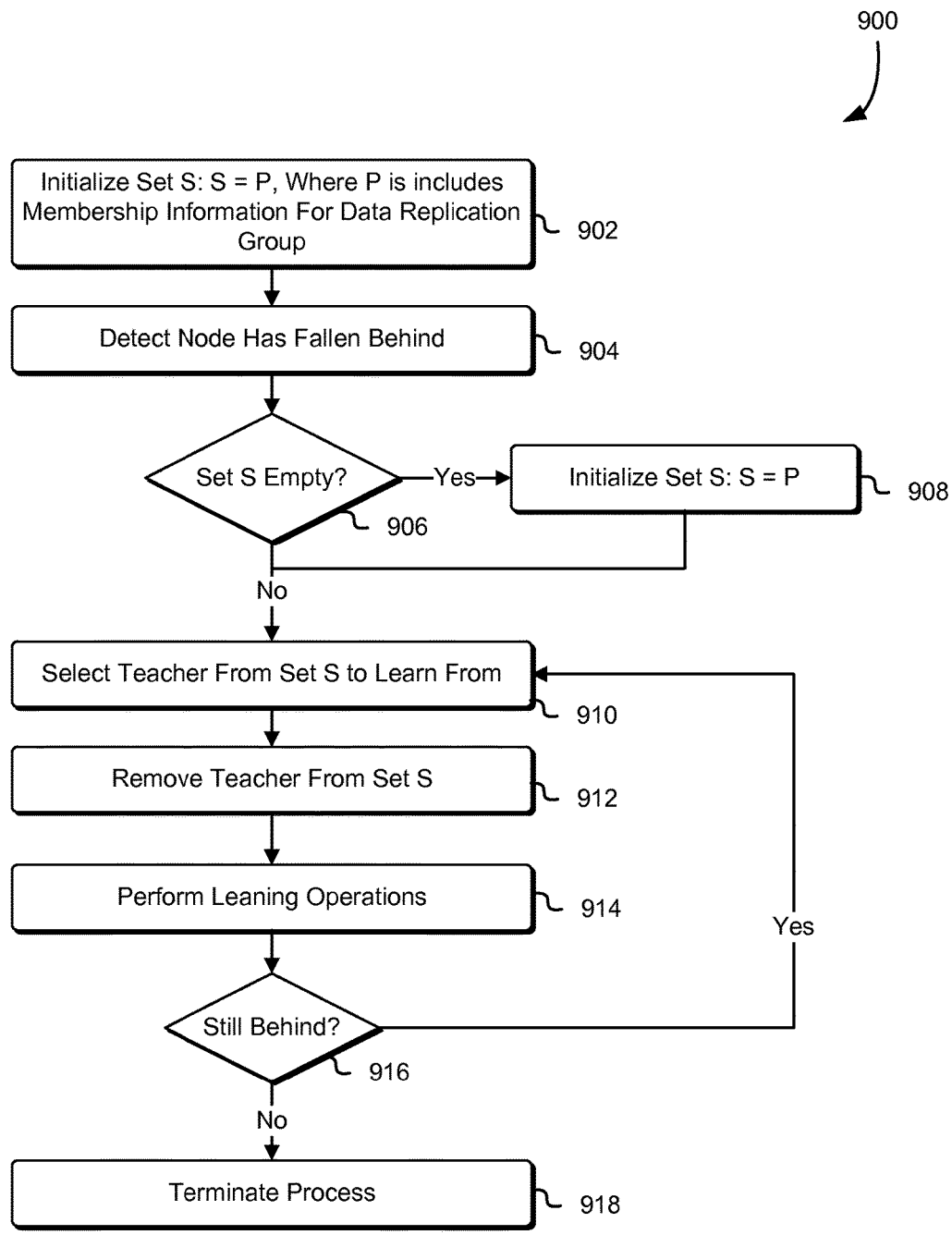
FIG. 9 shows an illustrative process which may be used by a set of nodes of a data replication group to perform a catchup algorithm.

FIG. 9 is a block diagram illustrating an example of a process 900 for detecting the state of a node that has become stale and executes an unsupervised round robin catchup algorithm in accordance with at least one embodiment. The process 900 may be performed by any suitable system such as learner of a data replication group as described above in connection with FIG. 8. The process 900 includes initializing a set 'S' to include membership information of a data replication group set of nodes which may receive learning requests 902. The set S may include location information or identification information for the node originally (e.g., initial members) included in the data replication group. The set S may be a data structure or other suitable mechanism for organizing information corresponding to the membership (e.g., nodes) of the data replication group. The initial membership information may be defined as 'P.' The initial membership may include the set of nodes added to the data replication group when the data replication group was initialized or may include the set of nodes in the data replication group when a particular node was added or removed to the data replication group. Both the set S and the membership information P may be maintained by the computer systems executing the nodes of the data replication group. The membership information P may be updated as nodes are added or removed from the data replication group. The set S may be modified as need during execution of the catchup algorithm. At a certain point in time of the execution of the data replication group a node may then detect that the node has fallen behind 904. The node may detect that it has fallen behind based at least in part on the operation of a consensus protocol of the data replication group as described above. For example, the node may not have received a heartbeat or other message associated with the data replication group after the expiration of an interval of time.

The node may then determine if the initialize set S is empty 906. If the set S is not empty, the node then has membership information of the data replication group and may then select a teacher from the set to transmit a learning request to 910. If the set is empty, the node may initialize the set with information P corresponding to the current membership of the data replication group and may then select a teacher from the set to transmit a learning request to 910. The node may then remove the teacher from the set 912. This may enable the node to more efficiently perform a catchup operation by not sending two or more learning requests to the same node in the set. Once the teacher is removed from the set, the node may perform learning operations 914.

The learning operations may include obtaining information corresponding to the operations committed and/or performed by the teacher. For example, the node may obtain one or more log segments from the teacher as described above. As another example, the node may take a snapshot of the teacher and may copy the snapshot to the node. After performing the learning operations, the node may then determine if the node is still behind 916. The node may determine if the node is still behind by at least comparing the current state of the node to the current state of the data replication group. The node may also determine if the node is still behind based at least in part on log information obtained from the teacher. If the node is behind, the node may then select a new teacher from the set of nodes and may continue the process 900 from step 910. However, if the node determines that the node is no longer behind, the node may terminate the process 918.

Figure 10:
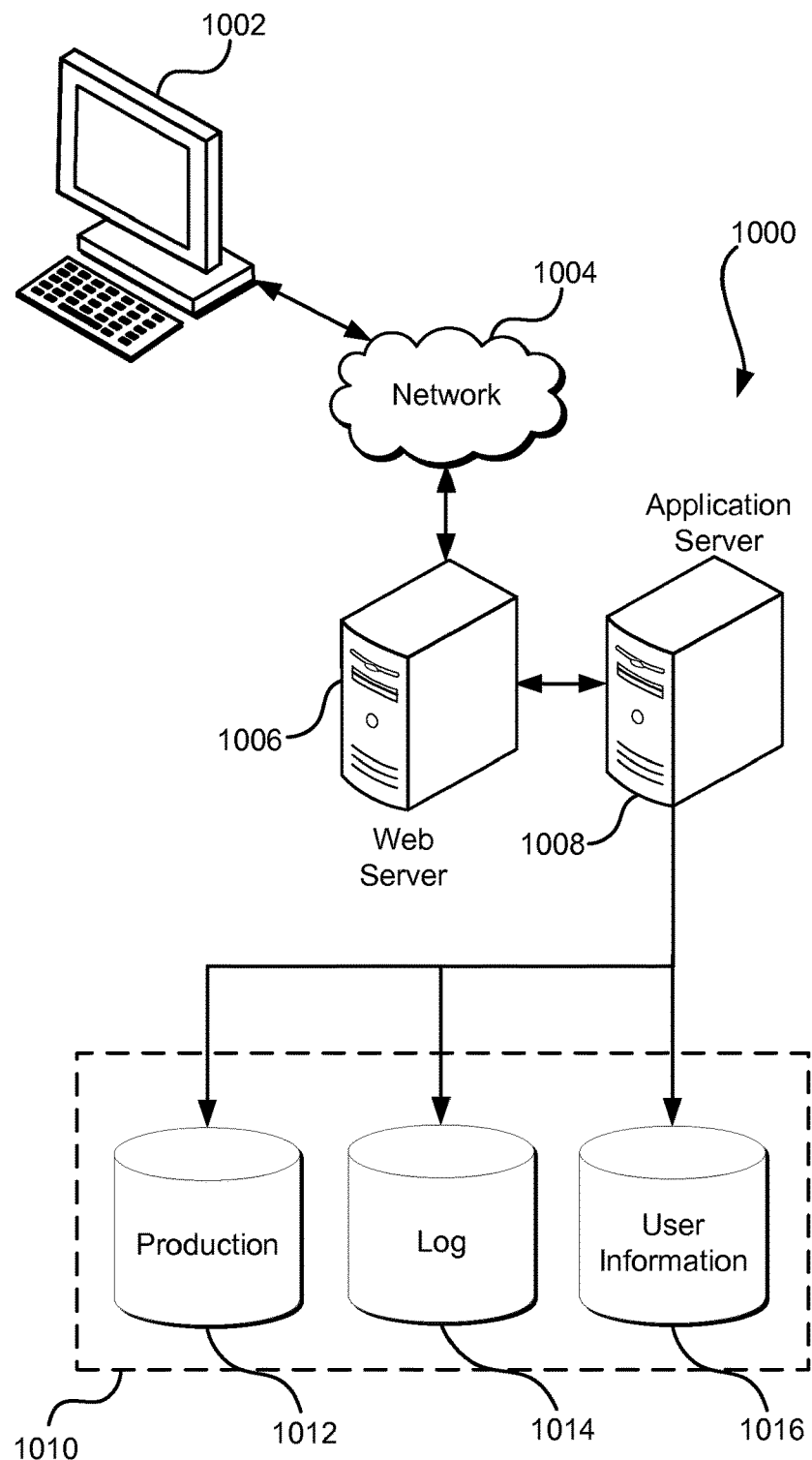
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
  receiving, at a first node of a data replication group, a message from a second node of the data replication group, where the data replication group comprises a plurality of nodes implementing a consensus protocol;
  determining to commit an operation to the first node, where the operation is indicated in the message;
  obtaining an operation number corresponding to the operation;

obtaining a previous operation number corresponding to a previous operation committed immediately prior to the operation;

recording the operation number and the previous operation number in a log entry such that the log entry indicates that the first node committed the previous operation immediately prior to the operation in error, wherein the error indicates that a gap exists between the operation number and the previous operation number in the log entry; and determining validity of the gap and other gaps in a log that comprises the log entry and other log entries by using state information of the node and state information of the data replication group.

2. The computer-implemented method of claim 1, further includes providing the log to a client.

3. The computer-implemented method of claim 2, wherein the computer-implemented method further includes detecting an error performed by the first node based at least in part on the log entry and one or more other log entries generated by plurality of nodes of the data replication group.

4. The computer-implemented method of claim 3, wherein the client is further configured to transmit an alarm to a replication group service as a result of detecting the error.

5. A system, comprising:
one or more processors; and
memory that includes instructions that, when executed by the one or more processors, cause the system to:
receive a message from a node of a data replication group, the data replication group including one or more nodes implementing a consensus protocol;
obtain an operation number associated with a performed operation and a previous operation number associated with a previously performed operation;
determine whether the operation number and the previous operation number in a log entry of a log is valid based at least in part on analyzing whether one or more gaps in the log entries in the data replication group exists; and
mitigate errors to the one or more gaps in the log entries in the data replication group.

6. The system of claim 5, wherein the memory further includes instructions that, when executed by the one or more processors, cause the system to obtain the log such that the log is processed and made available to an event stream.

7. The system of claim 6, wherein the memory further includes instructions that, when executed by the one or more processors, cause the system to delete entries in the log as a result of a command from a log collector.

8. The system of claim 5, wherein:
the system further comprises a computer system configured to detect errors in an implementation of the data replication group; and
the memory further includes instructions that, when executed by the one or more processors, cause the system to transmit the log to the computer system.

9. The system of claim 5, wherein:
the memory further includes instructions that, when executed by the one or more processors, cause the system to transmit a first proposal to one or more other nodes of the data replication group; and
receiving the message further comprises receiving a second proposal indicating an operation to be performed.

10. The system of claim 5, wherein the operation number further comprises a value relative to the data replication group and is configured to increase with each performed operation of the data replication group.

11. The system of claim 5, wherein recording the operation number further comprises recording the operation number in a linked list in the log entry, such that the operation number is linked to the previous operation number.

12. The system of claim 5, wherein the memory further includes instructions that, when executed by the one or more processors, cause the system to separate the log into a plurality of segments indicating operations performed by the system.

13. A non-transitory computer-readable storage medium comprising thereon executable instructions that, when executed by one or more processors of a computer system, cause the computer system to at least:
obtain a log generated by a node of a data replication group, the data replication group comprising one or more nodes implementing a consensus protocol;
determine a set of operations performed by the node based at least in part on the log;
detect a gap in the set of operations, where the gap in the set of operations is indicated by a chaining mechanism utilized to generate log entries of the log;
determine a validity of the gap based at least in part on a first operation performed by the node indicated by a log entry of the log and a previous operation performed by the node indicated by the log entry of the log by at least comparing state information of the node with state information of the data replication group;
detect a second gap in the set of operations, where the second gap in the set of operations is detected based at least in part on a chaining mechanism utilized, by the node, to generate log entries of the log;
determine that the detected second gap is a valid operation of the data replication group based at least in part on the log entries of the log; and
transmit a notification indicating information about the gap and the second gap.

14. The non-transitory computer-readable storage medium of claim 13, wherein the instructions further comprise instructions that, when executed by the one or more processors, cause the computer system to determine additional information associated with the detected gap in the set of operations, where the additional information indicates at least a cause for the detected gap in the set of operations.

15. The non-transitory computer-readable storage medium of claim 14, wherein the instructions further comprise instructions that, when executed by the one or more processors, cause the computer system to provide the additional information for remediating errors occurring in the data replication group.

16. The non-transitory computer-readable storage medium of claim 13, wherein the instructions further comprise instructions that, when executed by the one or more processors, cause the computer system to:
aggregate a set of logs from a set of nodes of the data replication group.

17. The non-transitory computer-readable storage medium of claim 16, wherein the instructions further comprise instructions that, when executed by the one or more processors, cause the computer system to determine the validity of the gap and the second gap based at least in part on information from the aggregated set of logs.

18. The non-transitory computer-readable storage medium of claim 13, wherein the instructions that cause the computer system to determine the validity of the gap further include instructions that cause the computer system to determine that the gap is an error as a result of the node not performing one or more operations prior to performing the first operation indicated by the chaining mechanism.

19. The non-transitory computer-readable storage medium of claim 13, wherein the instructions that cause the computer system to determine the validity of the gap further include instructions that cause the computer system to determine that the gap is a result of a delay in providing the log or dropping the log.

20. The non-transitory computer-readable storage medium of claim 13, wherein the instructions that cause the computer system to transmit the notification further include instructions that cause the computer system to transmit the notification to a replication group service responsible for management of the data replication group.

21. The non-transitory computer-readable storage medium of claim 13, wherein the instructions that cause the computer system to determine the validity of the gap further include instructions that cause the computer system to apply a catchup algorithm that enables the node to compare the state information of the node with the state information of the data replication group and determine whether the state information of the node matches the state information of the data replication group.

\* \* \* \* \*